Dec. 16, 1952 T. R. SMITH 2,621,797
SELF-CLEANING FILTER
Filed Dec. 13, 1947 2 SHEETS—SHEET 1

INVENTOR.
Thomas R. Smith
BY Wilkinson, Huxley, Byron & Hume
ATTORNEY.

Dec. 16, 1952     T. R. SMITH     2,621,797
SELF-CLEANING FILTER

Filed Dec. 13, 1947     2 SHEETS—SHEET 2

INVENTOR.
Thomas R. Smith
BY Wilkinson, Huxley, Byron & Hume
ATTORNEY.

Patented Dec. 16, 1952

2,621,797

UNITED STATES PATENT OFFICE 2,621,797

SELF-CLEANING FILTER

Thomas R. Smith, Newton, Iowa, assignor to Maytag Company, Newton, Iowa, a corporation of Delaware Application December 13, 1947, Serial No. 791,483

7 Claims. (Cl. 210—152)

This invention relates to filters for liquids, more particularly to filters of the self-cleaning type and it has for an object to provide improved apparatus of the character set forth.

In clothes washing machines, especially the type wherein a portion of the washing liquid continuously flows from the receptacle in which fabrics are washed and is recirculated back to the washing receptacle, it is desirable to prevent or retard the return of foreign matter or particles such as, for example, heavy dirt, sand, lint, etc. carried from the receptacle by the liquid, because it is more or less detrimental to the cleaning operation to keep returning the separated dirt and solid matter thereto. Also, it is desirable to provide means for disposing of the filtered foreign particles at predetermined intervals.

It is therefore another object of the invention to provide a filter which retards the flow of foreign matter and is periodically actuated to release the retarded foreign matter.

It is still another object of the invention to provide a filter for a recirculating type automatic washing machine which retards the flow of heavy and large foreign particles back to the cleaning compartment and is periodically actuated by a condition in the cycle of washing to permit the retarded foreign matter to flow to drain.

It is another object of the invention to provide a filter which has self-cleaning characteristics.

It is another object of the invention to provide a filter with a plurality of filaments having small spaces therebetween disposed so that liquid flows thereacross in a tortuous manner whereby foreign particles flowing with the liquid are retarded and retained.

It is yet another object of the invention to provide a filter in a container which is so disposed as to be moved away from an outlet opening when the liquid in the container exceeds a predetermined level.

It is still another object of the invention to provide a self-cleaning filter in a discharge opening which acts to retard foreign particles from flowing therethrough during certain periods and to automatically move to a second position to permit flow of foreign particles during certain other periods and at the same time be positioned to permit self-cleaning thereof.

It is another object of the invention to provide a filter about an outlet opening to retard flow of foreign particles in one position and to release the foreign particles in a second position which at the same time is positioned to resist vortical flow through the outlet opening.

These and other objects are affected by the invention as will be apparent from the following description and claims taken in connection with the accompanying drawings, forming a part of this application, in which:

Figure 1:
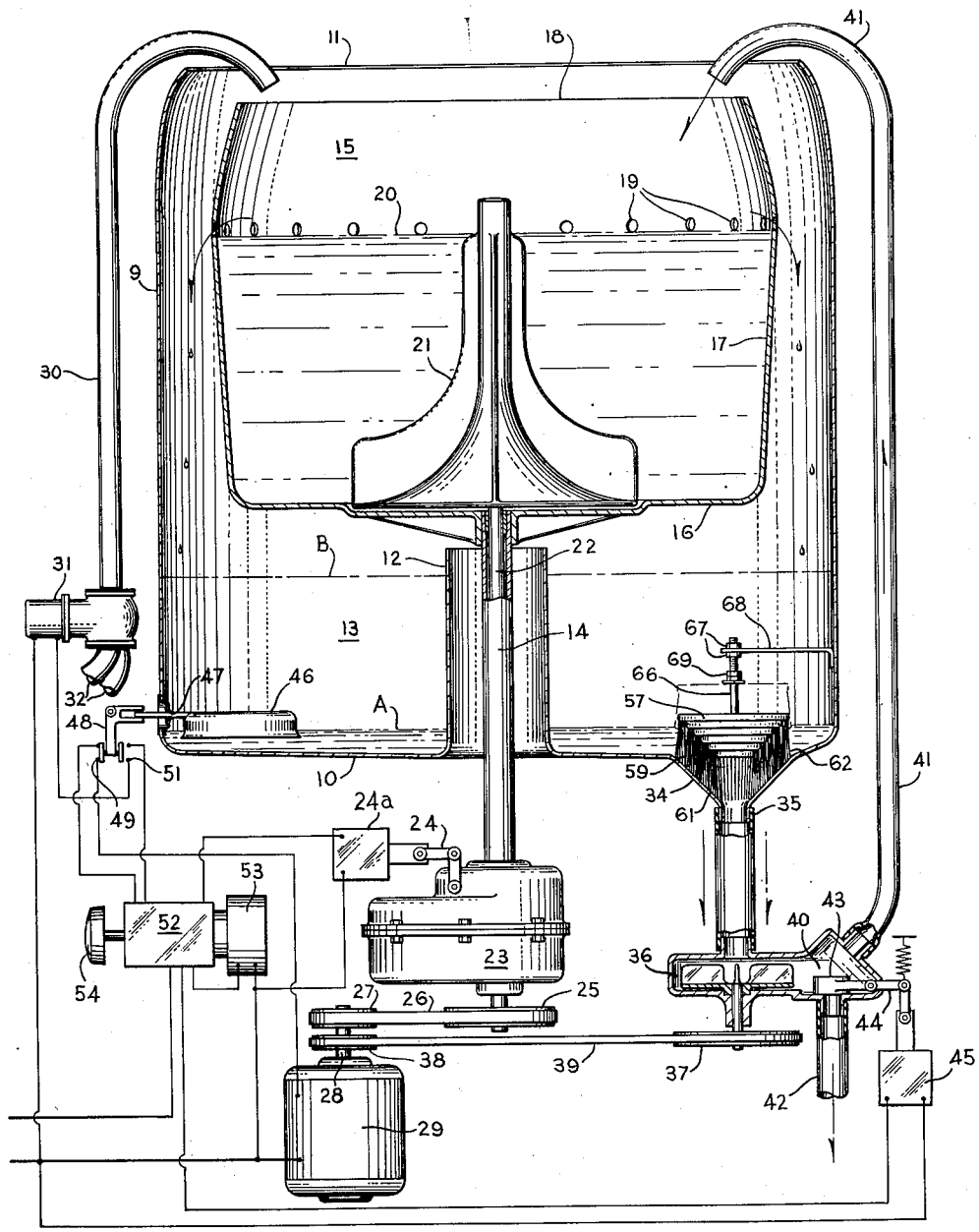
Figure 1 is a diagrammatic partial vertical sectional view of a washing machine of an automatic type having liquid recirculation features and with the improved filter applied thereto.

Referring now to the drawing for a brief description of one form of apparatus to which the invention may be applied there is shown in Figure 1 a stationary cylindrical tub or container 9 having a bottom 10 and an access opening 11 at the top. Substantially centrally located in the bottom portion of the tub is an annular upstanding open ended column 12 to provide a reservoir or storage space 13 for washing liquids between the column and side wall of the container and an opening through which a hollow shaft or sleeve 14 extends into the container. This hollow shaft is adapted to support and rotate a movable tub or receptacle 15, having an imperforate bottom 16 and an upwardly extending side wall 17, in the upper portion of the container and to permit relative motion therebetween. The upper portion of the receptacle 15 has an access opening 18 in alignment with the opening 11 in the container and a plurality of overflow openings 19 disposed on a horizontal plane in its side wall which define a washing fluid or liquid level 20 therein. It is obvious that should the level of liquid 20 tend to rise above the openings 19, it will flow out of the openings and fall into the lower portion of the stationary tub 9.

Mounted in the receptacle is an agitator 21, of any suitable type, which is oscillated or actuated by means of a shaft 22 concentric with and journaled in the hollow shaft 14. Both of these shafts are operatively connected to a motion transmitting mechanism of any suitable type, such as that generally indicated at 23. As this particular mechanism forms no part of the invention, further description is not deemed necessary other than to point out that the inner shaft 22 is preferably actuated in such manner as to agitate the fabrics and washing liquid and the hollow shaft 14 is preferably rotated in a single direction to rotate the receptacle at relatively high speed. The means for selectively actuating the shaft 22 or rotating the shaft 14 is preferably under control of a shifting mechanism generally indicated at 24 and which includes a solenoid 24a. A pulley 25 disposed on the input side of the transmitting mechanism 23 is driven by means of a belt 26 and a driving pulley 27 rigidly secured to a shaft 28 on a drive motor 29.

Water or washing liquid is admitted through a vertical conduit 30 having its upper end disposed so as to discharge water therefrom directly into the receptacle 15. A solenoid operated constant temperature valve 31 attached to the conduit 30 controls the mixture of hot and cold water from any suitable source 32, in a manner to be hereinafter described.

Disposed in the bottom 10 of the stationary container 9 is an integral frusto-conical wall or dished portion 34 forming part of a discharge or outlet opening 35. This opening leads to the inlet of a centrifugal pump 36 driven by a pulley 37 operatively connected to the drive motor 29 by means of a driving pulley 38 and a belt 39. The discharge side of the pump leads to a chamber 40 communicating with a recirculating conduit 41 and a drain conduit 42. A double acting valve 43 operated by means of a lever 44 connected to a solenoid 45 is utilized to direct the flow of washing liquid either to the recirculating conduit 41 disposed to discharge into the rotatable receptacle 15 or to the drain conduit 42 which discharges the liquid to the usual sewerage system. With the valve in the position shown, any liquid discharged by the pump 36 flows into the chamber 40 and through the recirculation conduit 41 back into the receptacle 15.

Also mounted adjacent the bottom 10 is a switch operating float 46 pivoted at 47 to actuate a lever 48 carrying a pair of contacts 49 and 51. The contacts 51 and 49 are utilized to energize the solenoid valve 31 and driving motor 29, respectively, and act in series with a sequential controlling or timing means 52. This timing means causes the washing apparatus to perform a series of operations in a predetermined sequence and is driven by means of a timer motor 53 and it is also subject to manual adjustment or selection through a control knob 54. As the particular means for causing the apparatus to perform various functions, the drive and manual adjustment therefore may be of any suitable type and as other apparatus may be substituted for that shown and described, further detailed description is not deemed necessary. Also, any suitable float and float operated switch may be utilized instead of the particular type shown.

Figure 2:
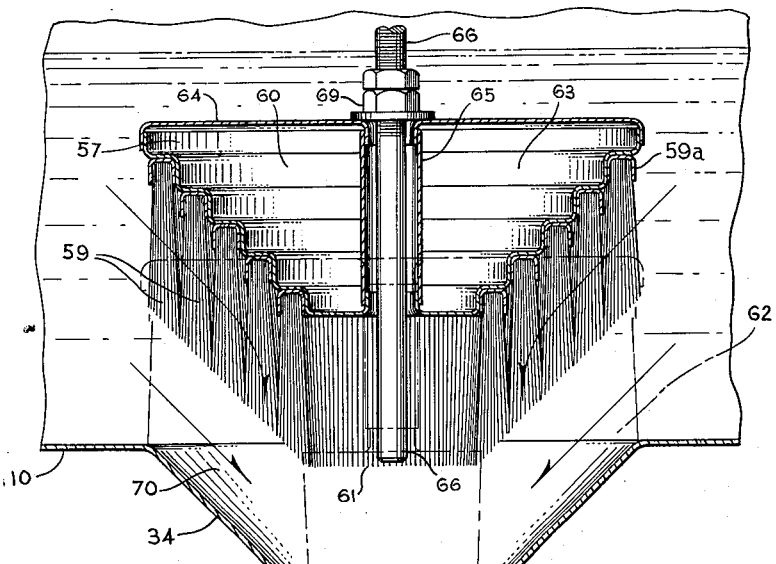
Figure 2 is an enlarged vertical sectional view of the improved filter shown in Figure 1 in its raised position.
Figure 3:
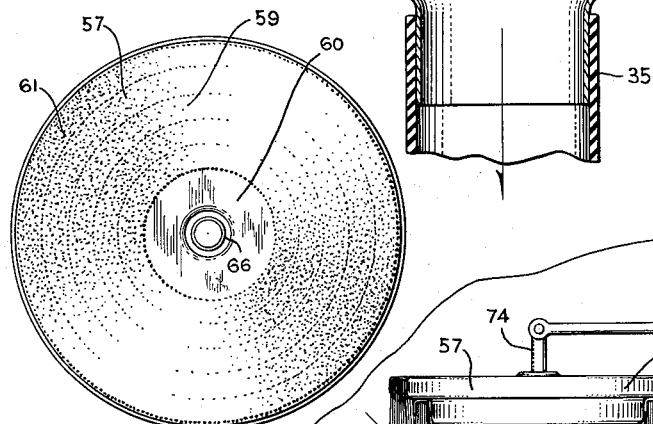
Figure 3 is a bottom plan view of the filter shown in Figures 1 and 2.

Referring now to the means for filtering the washing liquid there is shown, in Figures 1, 2 and 3, a displaceable filtering means or element 57 disposed about the outlet passage 35 at the bottom 10 of the stationary container 9. The filter element, in this embodiment, preferably comprises a plurality of rows of closely spaced downwardly projecting filaments or bristles 59 mounted in annular U-shaped channels 59a of varying diameters rigidly secured to the lower portion of a stepped substantially frusto-conical movable base member or structure 60 which conforms generally, although not necessarily, to the conical portion 34 at the bottom of the tub. It is to be understood that the particular manner of securing the bristles to the base 60 is not too important in that any suitable means may be utilized. The opposite or free ends 61 of the filaments facing in the direction of the outlet opening 35 are trimmed or cut to conform to and rest on or abut the frusto-conical wall portion 34 about the outlet opening 35. It can be seen from the drawings that when the edges of the downwardly projecting filaments are in engagement with the frusto-conical wall portion 34 a space or passageway 62 is provided between the portion 34 of the tub and the base portion 60 on the filter element through which washing liquid flows. Thus foreign particles tending to flow to the outlet opening 35 are restricted or retarded by the closely spaced filaments as the water flows therearound and heavy particles are retained therein.

A float or air chamber 63 capable of moving or lifting the filter 57 away from the outlet opening 35 is preferably formed as part of the filter element and comprises the base 60 secured to a top wall 64 at its outer diameter and both of these elements are united by an elongated guide tube 65 at the central portion. This air chamber or float acts to raise and lower the filter element in accordance with the quantity of washing liquid in the bottom of the stationary tub 10.

In order to insure the proper positioning of the filter element 57 as it is raised and lowered by the liquid accumulated in the tub there is provided a guide rod or member 66 extending loosely through the annular tube 65 and downward toward the outlet 35. The upper end of the guide rod is rigidly fastened by bolts 67, or any other suitable means, to the bracket 68 secured to the stationary tub 10. A stop or shoulder 69 formed or positioned on the guide rod 66 limits the upward travel of the filter element when the lower portion of the tub is filled with water above a predetermined level. This shoulder 69 is so positioned as to permit an unrestricted annular space 70 between the conical portion 34 of the drain and the free ends 61 of the filaments during the time when the float is raised but at the same time is sufficiently close so that foreign particles adhering to the downwardly projecting bristles are vigorously acted on by the water flowing to the drain to disengage a large portion of the foreign particles. Also, with the filter in its retracted position vortical movement of the water in its passage downwardly through the outlet opening is resisted and consequently a more rapid emptying of the tub is accomplished.

The utility of this filter element 57 will be apparent from the following brief description of the operation of the machine. The operator places the detergent and fabrics to be washed in the rotary receptacle 15 and thereafter turns the control knob 54 to its desired "starting" position. Although the control dial is positioned the switch operated float 46 is in its downward position to thereby de-energize the main drive and control circuits while the contact 51 is closed. This acts to energize the solenoid valve 31 to permit water to flow through the conduit 30 from the source 32 and be discharged into the receptacle. When the level of liquid in the receptacle reaches the openings 19 the water overflows and collects in the bottom of the stationary tub 10.

Due to the fact that the stationary tub is empty the filter element will be positioned against the conical portion 34 of the outlet opening by means of gravity. As the level in the stationary tub rises to a predetermined level A which is normally slightly below the point where the float chamber 63 would lift the filter element 57 away from the outlet opening, the float 46 is actuated to deenergize or cut off the flow of water to the receptacle and at the same time energize the drive motor 29 and timer motor 53 through contact 49. The drive motor rotates the driven pulley 25 at the drive mechanism 23 which causes the shaft 22 to oscillate the agitator 21 to thereby wash the clothing or fabrics.

As the drive motor 29 rotates the pump 36 it withdraws the washing liquid through the filter element 57 and discharges the filtered washing fluid into the chamber 40. During the washing operation the double acting valve 43 is in the position shown wherein the drain passage 42 is closed and the liquid flows through the recirculating conduit 41 and is discharged back into the receptacle. Thus it can be seen that during the washing operation filtered washing liquid is continuously withdrawn from the bottom of the tub 10 by the pump and is discharged back into the receptacle 15 and the washing liquid above the normal liquid level 20 flows out of the overflow openings 19 and falls to the bottom of the tub 10. This washing liquid carries with it heavy dirt and foreign particles and these are carried toward the drain opening. As the water flows through the filter in a tortuous path the closely spaced bristles restrict the flow therethrough and at the same time retard and hold a large portion of the foreign particles.

After a predetermined time interval the timer motor 53 advances the timing means 52 which completes a circuit through solenoid 45 which is actuated to shut off the recirculating conduit 41 and to open the chamber 40 to the drain conduit 42. The advancement of the timing means 52 also completes a circuit through the solenoid 24a to operate the shifting mechanism 24 for disconnecting the shaft 22 from its driving relation with the motor 29 and to cause an operative driving relation between the motor 29 and the sleeve 14 to thereby rotate the receptacle 15 at high speed in one direction. When the receptacle is rotated at high speed, the washing liquid is rapidly thrown or expelled from the tub through the openings 19 and accumulates in the bottom of the stationary tub. The space between the bottom of the tub and the top of the annular column 12 is preferably of such capacity as to hold at least the entire contents of the washing liquid in the rotary receptacle 15. During the initial portion of the spin period the flow of water from the receptacle 15 is at a much greater rate than can be removed by the pump 36, therefore the water level rises therein to approximately the level B. As the water level rises above a predetermined level, determined by the position and size of the float, the float chamber 63 on the filter element 57 rises with the level and causes the free ends of the filaments on the conical filter element to be withdrawn from the conical surface 34, the distance of withdrawal being determined by the shoulder 69 on the guide rod 66. At this time it can be seen that a large portion of the liquid is permitted to flow directly to the drain. Also, due to the spacing between the bottom edges 61 of the filter element and the bottom of the tub, a portion of the liquid flow is about the filaments in substantially parallel relation thereto and acts to wash away a major portion of the foreign particles adhering thereto which are pumped to drain along with the washing liquid.

Another advantage of limiting the upward displacement of the filter element 57 with respect to its seat 34 is that vortical movement of the water in its passage downwardly through the outlet opening 35 is resisted with a resultant effect of permitting a larger quantity of water to flow through the outlet opening in a given period of time.

The filter element 57 will remain in its retracted or uppermost position against the shoulder 69 until the liquid level in the stationary tub drops below a predetermined level, after which the filter element under the influence of gravity will be moved downwardly in guided relation to the rod 66 into its proper filtering position in contact with the seat 34.

Should the openings between the filaments of the filter element for any reason become clogged or restricted materially, the water level will raise in the stationary tub and this in turn will raise the filter element 57 slightly away from the drain opening to permit the proper flow of liquid for recirculation. Under this condition, filtering would not take place, but the returning of washing liquid to the receptacle is not impaired.

At the end of the spinning operation the solenoid 45 is deenergized which causes the double acting valve 43 to move to its drain "shut-off" position and the solenoid valve 31 to open to permit rinse water to be admitted to the receptacle. The sequence of operation for rinsing and spinning is similar to that for washing and spinning.

Figure 4:
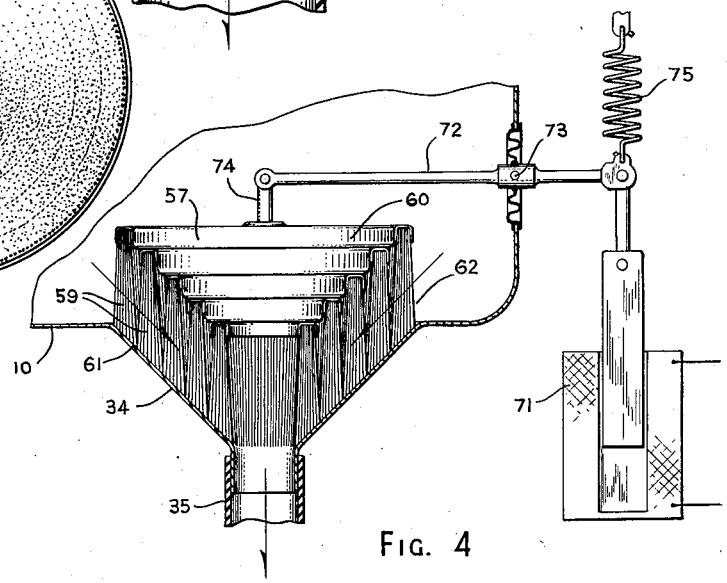
Figure 4 is a vertical sectional view of the improved filter with a modified form of actuating means therefor.

Referring now to the modification as shown in Figure 4, there is provided a positive means for actuating the filter element 57. This means includes a solenoid 71 acting on a lever 72 pivoted at 73 which provides a guide means for holding the filter element 57 in a substantially vertical position above the outlet opening 35. The opposite end of the lever remote from the solenoid is connected to a link 74 secured to the filter element. The solenoid in this instance is controlled by the timer element 52 and is energized to lift the filter element during the period when the receptacle 15 is rotated. Thus it can be seen that during the washing operation the filter element is disposed against the conical portion 34 of the tub by means of gravity and a spring 75 to retard foreign particles and when the solenoid 71 is energized the filter element 57 is moved away from the drain opening 35 to permit the foreign particles to be pumped to drain and at the same time clean the individual filaments in the filter element. When the solenoid is energized and seats it provides a suitable stop means for limiting the vertical movement of the filter element away from the seat.

Because the filter is formed of filaments which are all open on the bottom or lower portion and as the flow to the outlet has an angular component with respect to the length of the individual filaments, when the float raises the filaments away from the conical surface the collected dirt will be washed from the filaments through the open portion of the filter element and down the drain.

In the preferred form the filter is automatic in operation to the extent that no special control need be added, because the water level in the bottom of the tub 10 causes the filter to rise and the increased flow, due to the filter being out of the main path of flow, plus the higher water level with a resultant increased pressure, combines to effectively wash the collected dirt off the filter element. In the modification (Figure 4) the filter is identical except that it is operated by the timer.

From the foregoing it can be seen that a filter element has been provided which acts to retard the flow of foreign particles during certain periods and at other periods it acts to permit the discharge of foreign particles to drain. Although this filter element has been disclosed in conjunction with a recirculating type automatic washing machine it may be applied equally as well to other types of apparatus in which it is desirable to have intermittent filtering.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

It is claimed:

1. In combination, a container having a bottom wall with outlet means therein and adapted to have varying quantities of liquid supplied thereto, a filter element comprising a buoyant support, a plurality of substantially co-axial adjacently arranged generally vertical filtering units each of which comprises a body of adjacently disposed elongated filaments secured at their upper ends to said support, said outlet means including a seat engaged by the lower free ends of said filaments whereby said filtering element is effective in filtering liquid in said container up to a predetermined level, said filtering element being vertically displaceable from said seat by said buoyant support when said predetermined liquid level is exceeded whereby unfiltered liquid is discharged through said outlet means, and vertical guide means for said displaceable filter element.

2. The combination according to claim 1, wherein the filter seat is formed with a frusto-conical surface and the free ends of the filaments are adapted to be disposed in abutting relation over a substantial portion of said frusto-conical surface.

3. In combination, a container having a bottom wall with outlet means therein and adapted to have varying quantities of liquid supplied thereto, a filter element comprising a buoyant support, a plurality of substantially co-axial adjacently arranged generally vertical filtering units each of which comprises a body of adjacently disposed elongated filaments secured at their upper ends to said support, said outlet means including a seat engaged by the lower free ends of said filaments whereby said filtering element is effective in filtering liquid in said container up to a predetermined level, said filtering element being vertically displaceable from said seat by said buoyant support when said predetermined liquid level is exceeded whereby unfiltered liquid is discharged through said outlet means, vertical guide means for said displaceable filter element, and stop means for limiting the displacement of said filter element with respect to said outlet means.

4. In combination, a container having a bottom wall with outlet means therein and adapted to have varying quantities of liquid supplied thereto, a filter element comprising a buoyant support formed with an air-tight chamber having a vertical axially disposed guide-way extending therethrough, a plurality of substantially co-axial adjacently arranged filtering units each of which comprises a body of adjacently disposed elongated filaments secured at their upper ends to said support, said outlet means including a seat formed with a frusto-conical surface engaged by the lower free ends of said filaments whereby said filtering element is effective in filtering liquid in said container up to a predetermined level, said filtering element being displaceable vertically from said seat by said buoyant support when said predetermined liquid level is exceeded whereby unfiltered liquid is discharged through said outlet means, a guide rod disposed in said guide-way for maintaining said filter element in alignment with said outlet means, and a stop carried by said guide rod for limiting the displacement of said filter element with respect to said outlet means.

5. In a filter, the combination of a filter element and a container for receiving a variable quantity of liquid, said filter element comprising a base member and a plurality of elongated closely spaced generally vertical thin bristle elements having their upper ends secured to said base member to provide a barrier for removal of solid material to be separated by said filter, said container having an opening with a surrounding seat against which the lower opposite ends of the bristle elements abut, a guide member for restricting said filtering element to substantially vertical movement above said opening, and a stop for limiting the vertical movement of said filtering element with respect to said opening whereby the flow of liquid about and through said bristles in the direction of the opening effects cleaning thereof.

6. In a filter, the combination of liquid retaining means for receiving variable quantities of liquid and including a bottom wall having a liquid outlet provided with an adjacently disposed frusto-conical seat surrounding said outlet, a filter element including a base member and an annular body of elongated closely spaced generally vertical thin bristle elements, said bristle elements having their upper ends secured to said base member and their lower ends abutting said seat about said opening whereby foreign material in the liquid is retained by said bristle elements during flow through said opening, a guide member for maintaining the filter element in a vertical position and for restricting the same to substantially vertical movement above said opening, means for displacing said bristle elements vertically with respect to said seat and outlet opening during a cleaning operation to free the lower ends of said bristles, a stop for limiting the vertical movement of said filter element with respect to said seat whereby the liquid flowing through and about said bristle elements toward said opening removes the foreign material therefrom.

7. In a filter, the combination of a container for receiving variable quantities of liquid and including a bottom wall having a liquid outlet with a surrounding seat, a filter element including a base member and a plurality of elongated closely spaced generally vertical thin bristle elements, said bristle elements having their upper ends secured to said base member and their lower ends abutting said seat to provide a barrier for removal of solid material in the liquid during flow through said opening, a guide member for maintaining said filter element in a vertical position and for restricting the same to substantially vertical movement above said opening, and an electro-magnetic operating device operatively connected to said filter element for periodically displacing the same with respect to said seat to permit unfiltered liquid to flow through said outlet opening and whereby the flow of liquid through and about said bristles in the direction of the opening effects cleaning thereof.

THOMAS R. SMITH.

REFERENCES CITED

The following references are of record in the file of this patent:

UNITED STATES PATENTS

| Number | Name | Date |
|---|---|---|
| 687,979 | Chambers | Dec. 3, 1901 |
| 1,108,079 | Morrison | Aug. 18, 1914 |
| 1,497,921 | Levedahl | June 17, 1924 |
| 1,521,989 | Bergstrom | Jan. 6, 1925 |
| 1,874,475 | Ellingham | Aug. 30, 1932 |
| 2,298,096 | Dunham | Oct. 6, 1942 |
| 2,430,078 | Reinsch et al. | Nov. 4, 1947 |
| 2,439,535 | Wilson | Apr. 13, 1948 |
| 2,449,634 | Baade | Sept. 21, 1948 |
| 2,468,354 | Abbrecht | Apr. 26, 1949 |

FOREIGN PATENTS

| Number | Country | Date |
|---|---|---|
| 233 | Great Britain | Jan. 5, 1897 |